Nov. 25, 1969  P. H. MOYER  3,480,241
CHRISTMAS TREE HOLDER
Filed Nov. 2, 1967

INVENTOR.
PAUL H. MOYER
BY *Yates Dowell*
*Yates Dowell Jr*
ATTORNEYS

United States Patent Office 3,480,241
Patented Nov. 25, 1969

3,480,241
CHRISTMAS TREE HOLDER
Paul H. Moyer, Orlando, Fla., assignor to E-Z Mount Corporation, Orlando, Fla., a corporation of Florida
Filed Nov. 2, 1967, Ser. No. 680,158
Int. Cl. A47g *33/12*; B65j *1/22*
U.S. Cl. 248—44      2 Claims

ABSTRACT OF THE DISCLOSURE

A Christmas tree holder including an open top pan and spaced tension members for securing a tree in said pan.

BACKGROUND OF THE INVENTION

Field of the invention

This invention relates to supports for upright objects.

Description of the prior art

Many efforts have been made to support Christmas trees within containers; however, these prior efforts have been inadequate, buky, failed to properly support the tree, provided hazards likely to cause injury to persons or property, were easily broken, and lacked durability.

SUMMARY OF THE INVENTION

The present invention relates to a device for holding a Christmas tree in an upright position including an open-top pan or container having an outwardly extending marginal flange with outwardly open notches therein, an upwardly flared open-top socket member with openings therein through which liquid can pass, said cup being secured centrally within said pan or container, a plurality of elongated connecting members adapted to extend between and be secured in the notches in the marginal flange of said cup and around a Christmas tree in an elevated position from said pan, said chains having hooks at one end to allow fastening of the chain around a portion of a Christmas tree and said chains having portions connected by tension springs, whereby when engaged about a Christmas tree and engaged in the notches in the marginal rim of the container, a Christmas tree may be securely fastened in place and the container supplied with water to add weight as well as to water and keep the tree fresh.

It is an object of the invention to provide a device of attractive appearance, of simple inexpensive and practical construction, which will not be likely to cause injury to person or property, which will readily apply to trees of different sizes, by means of which a Christmas tree of large or small trunk size and with the end of the trunk cut at almost any angle can be installed in a minimum of time with a minimum of effort without tools or fasteners and the container filled with a weight-adding substance which will keep the tree fresh, such as water, earth or other material of adequate specific gravity to anchor the device under tension in a fixed location, as well as to provide a Christmas tree holder having a base sufficiently broad to prevent tipping, and one having a long life as well as being readily shipped and stored.

Another object of the invention is to provide a Christmas tree holder in the form of a container for supporting a tree and a plurality of tension applying members adapted to form connections between the container and the tree at a substantial elevation above the base of the tree, such tension applying members likewise serving as anti-tipping means which automatically increase the tension and resist tipping of the tree.

BRIEF DESCRIPTION OF THE DRAWING

Other objects and advantages of the invention will be apparent from the following description considered in conjunction with the accompanying drawing wherein.

DESCRIPTION OF THE PREFERRED EMBODIMENT

Figures 1, 2:
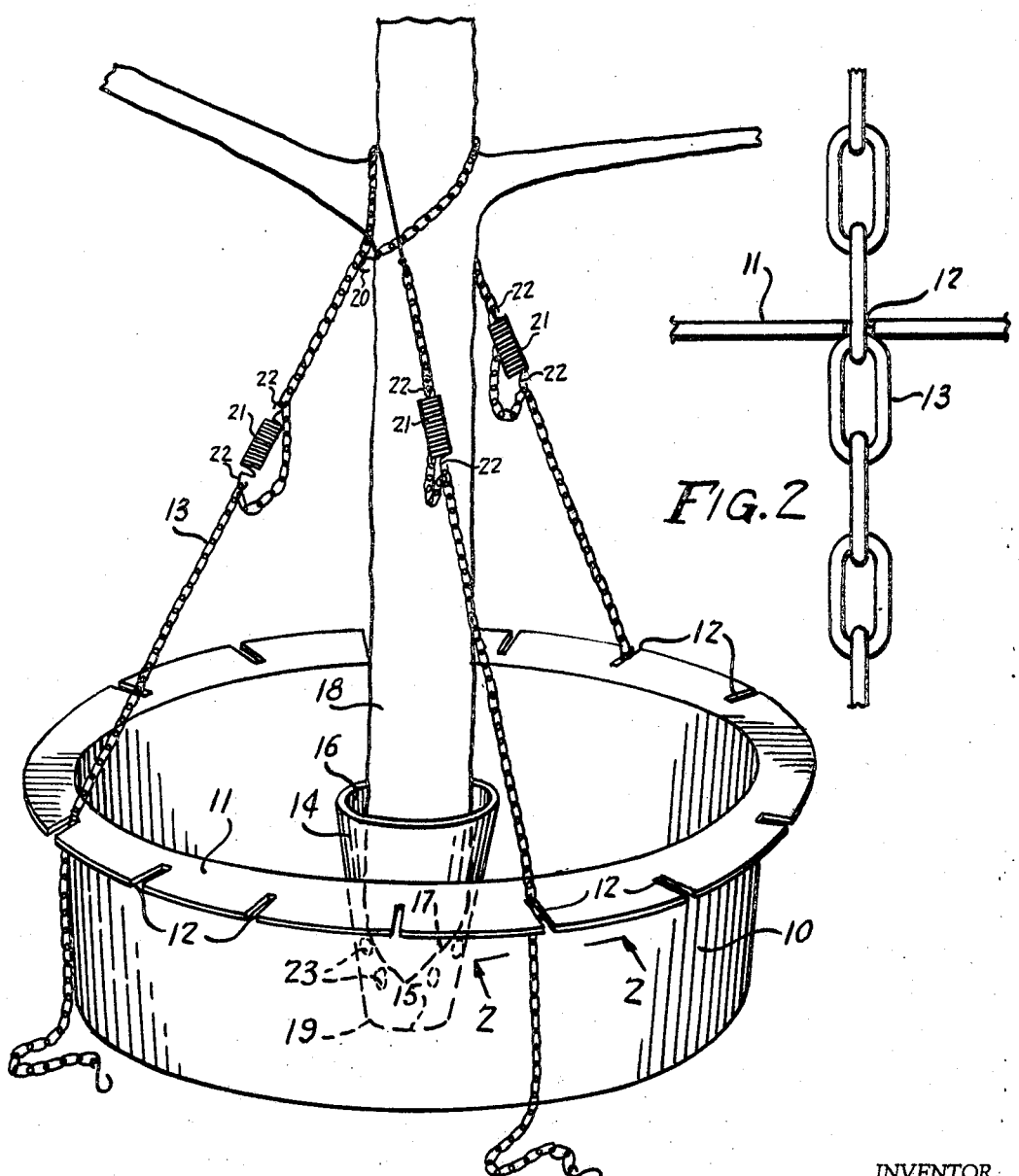
FIG. 1 is a perspective illustrating one embodiment of the invention in use.
FIG. 2, a section on the line 2—2 of FIG. 1.

With continued reference to the drawing, the Christmas tree holder of the present invention comprises an open-top container or pan 10 preferably round or circular and having a marginal outwardly extending flange 11 around its upper open end. The flange 11 is provided with slots or notches 12 into which a chain 13 may be inserted.

Within the pan or container 10 is disposed a flared or frusto-conical open-top cup or socket member, the bottom 15 of which is substantially smaller than its rolled over top 16 to facilitate insertion of the severed end 17 of the trunk of a tree 18 regardless of the shape of the end of the trunk. The cup 14 has openings 14' through which water can flow freely into the same for watering the tree.

The cup is attached as for example by spot welding 19 generally centrally of the pan or container 10 so that the pan and contained cup provide a ready receptacle for the lower end of the trunk of the tree and for water to be put into the container or pan to perform the dual function of adding weight to anchor the pan in a fixed position, as well as to supply water to the tree. Such water is intended to contain whatever ingredients are necessary to give the maximum effect to the tree that is used. The container or pan also may be used to receive weight in addition to or in place of water, such weight including metal, earth, stone or the like to assist in maintaining the tree in an upright position.

In order to anchor the tree in position, lengths of the link chain are provided with hooks 20 or other means to enable the looping of the upper end of the chain at an elevation around the tree while the lower end is hooked into one of the notches or slots 12. Three chains or more are preferred, located in equally spaced relation around the marginal flange 11 to retain the tree solidly in installed position.

In order to maintain the tree under tension relative to its supporting container or pan, a coil spring 21 may be provided with hook ends 22, which spring may be installed in connection with each chain by inserting such hook ends into spaced links of the chain with a loop of the chain between the hook ends 22.

In the use of the device a Christmas tree is inserted within the socket 14 after which one end of each of the elongated connectors 13 is looped around a portion of the tree at a substantial elevation above the pan and the other end of the elongated connector is inserted within one of the slots 12 with the spring 21 under tension. After the elongated members are in position around the trree the water with or without other heavy objects, may be introduced into the pan to prevent the tree from falling. In the event that the tree begins to tilt in one direction, the tilting will be resisted by the spring on the opposite side as the result of increase of tension thereon. It will, therefore, be readily understood that a Christmas tree holder is provided which fulfills the various objects stated previously.

The use of chains have been found to be advantageous as they are readily available, unlike rarely used cable which would be necessary to stock and cut, as well as to provide special connectives for splicing and attaching hooks.

It will be obvious to one skilled in the art that various changes may be made in the invention without departing from the spirit and scope thereof and therefore the invention is not limited by that which is illustrated in the drawing and described in the specification.

What is claimed is:

1. A Christmas tree holder comprising a container having a flange with spaced notches around the same, a perforated cup tapered from its smaller bottom end to its larger open upper end and attached generally centrally within said container, at least three lengths of link chain of a size to be received in said notches and be prevented from being pulled through the notch by an adjacent link of the chain, means whereby one end of the link chain may be extended around the tree and attached to itself to provide a loop, and tension means attached to said chain, whereby the trunk of a Christmas tree may be placed in said cup after which water may be introduced into said container to provide a weight for the base of said tree and to keep the tree fresh, and said chains can be looped around a portion of the tree at an elevation above said cup and engaged in notches in said container to support the Christmas tree under tension in upright position.

2. A holder for receiving the lower end of the trunk and maintaining a freshly cut tree in upright position and for supplying water to the lower end of the trunk to be absorbed and the moisture content of the tree supplemented, said holder comprising a pan of a size to provide a relatively large and deep water containing base for a tree to be held and a central socket portion for receiving and holding the lower end of the trunk of a tree therein and allowing free entry of water thereinto from said pan, a plurality of link chain connectors in spaced locations fastened angularly between said pan and at a higher elevation about the tree for maintaining the tree in upright position in said pan, said chain connectors having incorporated therein yieldable means for adjusting tension lengthwise of said link chain connectors, said pan having slotted portions about the upper outer extent of the same, each slotted portion being of a size adjustably to receive for quick attachment one of the links of the chain with the next link located across the slotted portion and retaining said chain against endwise movement in said slotted portion.

References Cited

UNITED STATES PATENTS

| | | | |
|---|---|---|---|
| 2,670,951 | 3/1954 | Lucky | 267—74 |
| 3,038,688 | 6/1962 | Thorburn | 248—44 |
| 3,227,405 | 1/1966 | Layton | 248—44 |
| 3,353,773 | 11/1967 | Budd | 248—44 |

ROY D. FRAZIER, Primary Examiner

F. DOMOTOR, Assistant Examiner

U.S. Cl. X.R.

248—361